United States Patent [19]

Belzile

[11] Patent Number: 5,919,260
[45] Date of Patent: Jul. 6, 1999

[54] ELECTRICAL APPARATUS PRODUCING DIRECT COMPUTER CONTROLLED VARIANCE IN OPERATION OF AN ELECTRICAL END DEVICE

[76] Inventor: Bruno Belzile, 2733 Sinton Pl., Pepper Pike, Ohio 44124

[21] Appl. No.: 08/840,500

[22] Filed: Apr. 21, 1997

Related U.S. Application Data

[63] Continuation-in-part of application No. 08/600,437, Feb. 12, 1996, abandoned.

[51] Int. Cl.$^6$ ........................................................ G06F 1/32
[52] U.S. Cl. ........................... 713/300; 713/320; 710/131; 365/227; 123/488
[58] Field of Search ........................ 395/750.01, 750.03, 395/750.07, 750.08, 311, 280; 365/227; 713/300, 320, 330, 340; 710/100, 131; 123/488

[56] References Cited

U.S. PATENT DOCUMENTS

| | | | |
|---|---|---|---|
| 4,681,076 | 7/1987 | Muller | 123/488 |
| 5,091,893 | 2/1992 | Smith et al. | 367/153 |
| 5,483,535 | 1/1996 | McMillen et al. | 370/452 |
| 5,726,901 | 3/1998 | Brown | 324/76.17 |

*Primary Examiner*—Ayaz R. Sheikh
*Assistant Examiner*—Ario Etienne
*Attorney, Agent, or Firm*—D. Peter Hochberg

[57] ABSTRACT

An electrical apparatus which does not require intervening combinational logic devices to condition signals produced by a computer prior to applying same to the switching devices for an electrical end device, such as a electric motor or the like is described. Controllers incorporating the electrical apparatus can be interconnected in a peer-to-peer arrangement permitting each controller to communicate with any or all of the other controllers within the network. Various types of devices, such as input/output devices, personal computers, sensors incorporating logic, etc., are connected to a way station associated with each controller permitting data collected by such a device associated with one way station to be accessible by its associated controller or by another controller within the peer-to-peer network

14 Claims, 6 Drawing Sheets

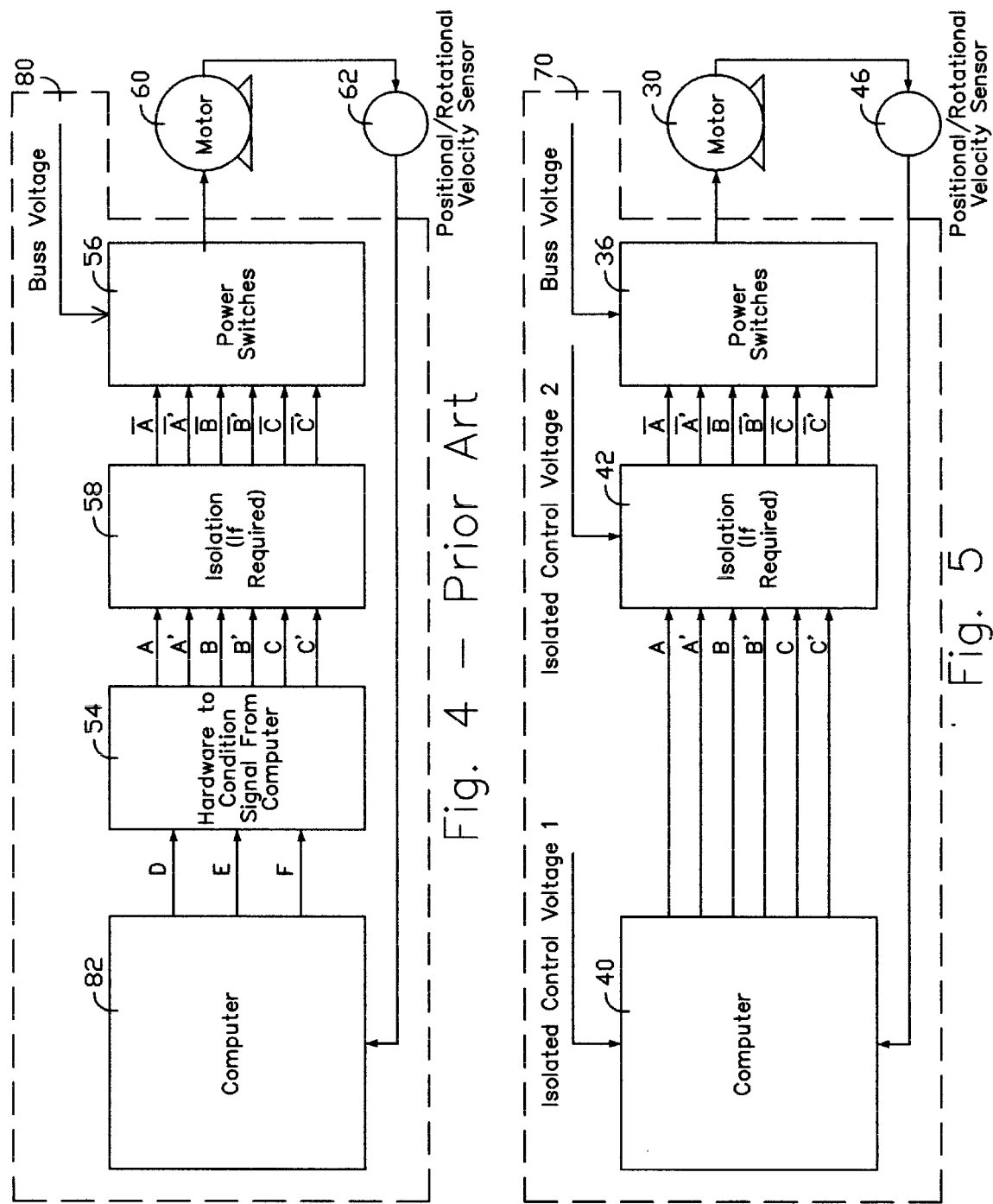

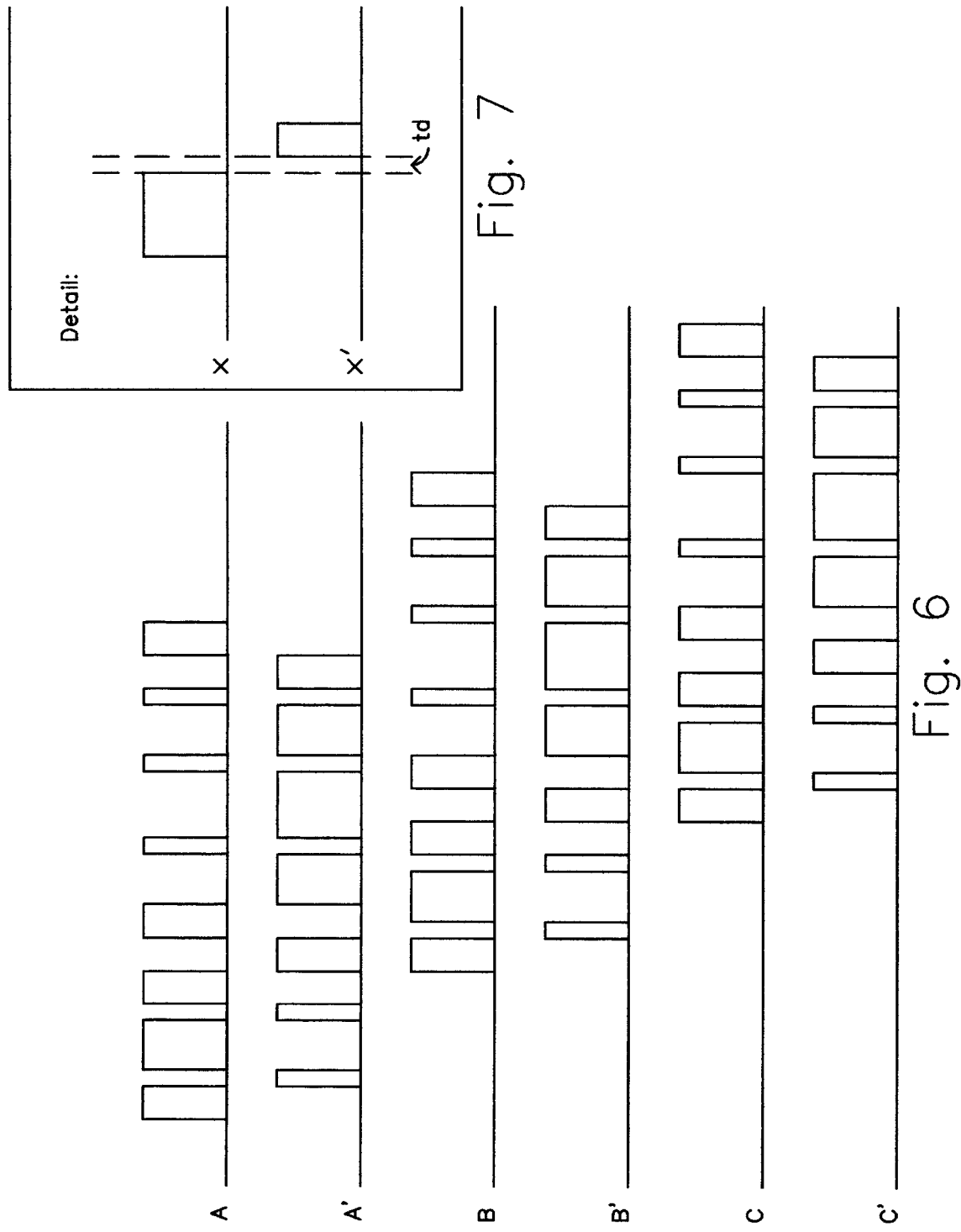

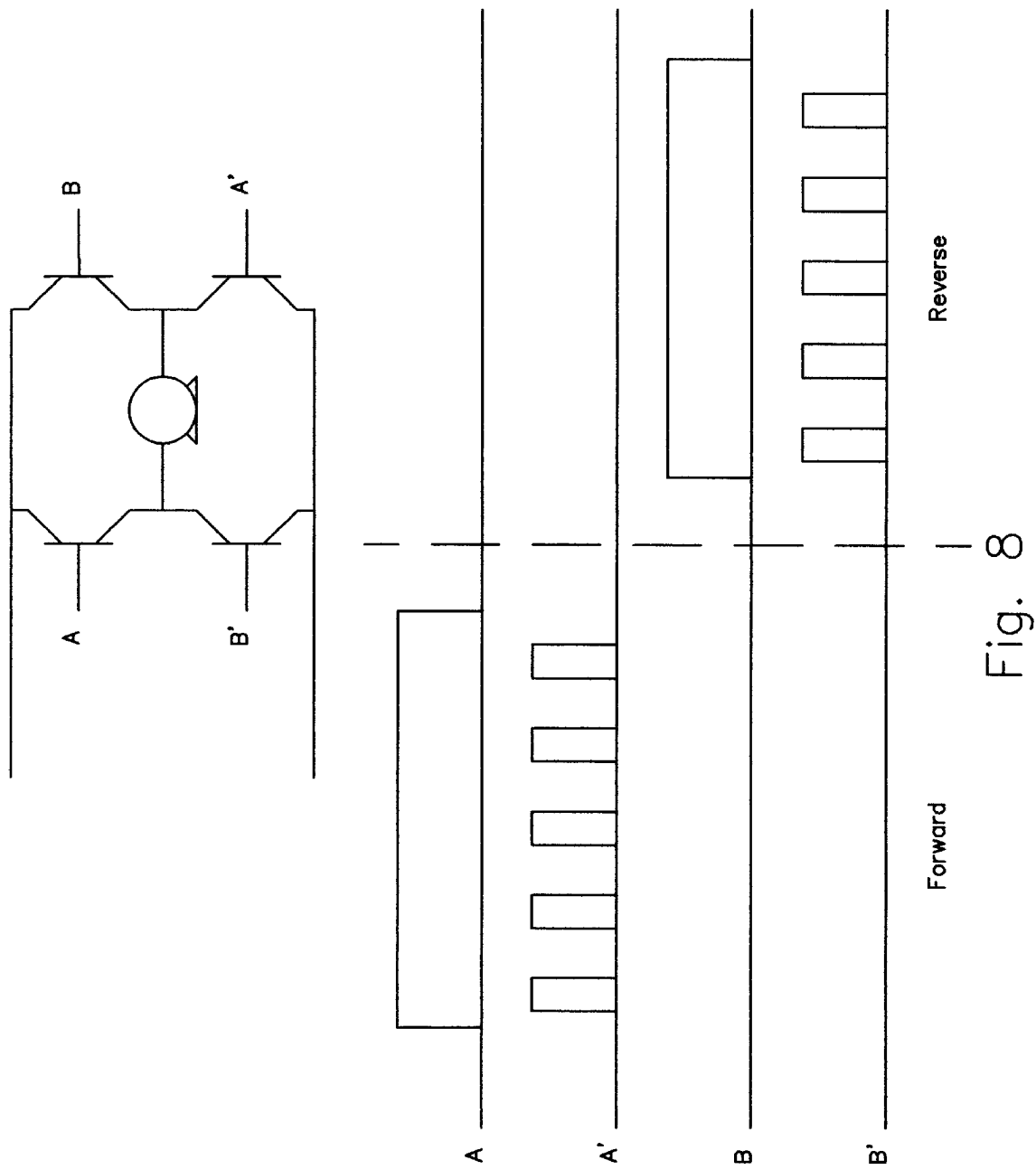

ELECTRICAL APPARATUS PRODUCING DIRECT COMPUTER CONTROLLED VARIANCE IN OPERATION OF AN ELECTRICAL END DEVICE

This application is a continuation-in-part of application Ser. No. 08/600,437 filed on Feb. 12, 1996 now abandoned.

TECHNICAL FIELD

The present invention relates, in general, to electrical apparatus utilizing a computer to control the energy required by an end device, such as a motor or the like, and, more particularly, to electrical apparatus which does not require the use of intervening combinational logic devices to condition the signals produced by the computer prior to applying same to the power switching devices associated with the end device and, further, to the utilization of such electrical apparatus within a communication network.

BACKGROUND ART

Historically, the electric drive industry has been relatively slow to adopt changes relating to controlling and/or powering end devices, such as motors. Typically, if a computer is involved in controlling the operation of a motor, a programmable logic controller (PLC) is usually utilized to control the computer within the motor controller, if used, via a standard physical communications layer. In addition, various types of sensors, e.g., temperature, pressure, etc., may be "hard-wired" to the PLC resulting in a substantial investment in cabling. In many instances a plurality of computers within electrical devices and their associated PLC's may be interconnected into a network, typically in a master-slave arrangement, resulting in a very complex system and substantial cost to "hard-wire" same. The end result is a system or network that is costly to install and difficult to reconfigure or alter with respect to functionality. In addition, the controller utilizes a substantial amount of hardware, such as gates, etc., (hereinafter referred to as intervening combinational logic devices) to condition the signals produced by the computer prior to applying same to the power switching devices associated with the end device. Such hardware makes it difficult to modify the system so as to be able to utilize power switching devices having different characteristics.

For example, if the end device is an AC motor, and a computer is used in the motor controller (sometimes called an inverter) to vary the speed of the motor, there will be logic gates and/or devices between the computer and the power switches (such as Integrated Gate Bipolar Resistors, IGBTs). Logic devices modify the signal(s) issued by the computer to ensure that the signal accomplishes the desired task and that a dead short does not occur between the switches. Because these switches turn off and on thousands of times per second, sometimes these logic gates are complex and are contained in an Application Specific Integrated Circuit (ASIC). The software within the computer must work to initiate the appropriate signals that make the intervening combinational logic devices operate the specific power switches properly. This combination of hardware and software therefore has the functionality of making the speed of an AC motor variable. But, even though the software in the computer could possibly be altered, the combination of hardware and software has now become fixed. If a radical new kind of power switch comes on the market or a switch with new characteristics is developed both the intervening hardware and possibly the software in the microcomputer will have to be altered for the motor controller to use the new power switching devices.

The lack of flexibility in the above mentioned motor controller is also apparent in the industrial automated systems in which it is used. Frequently the PLC will have hardware and software that will allow it to interact with the specific motor controller listed. Complexities of combining the different hardware and software combinations needed to accomplish even a relatively simple system of a few motors, motor controllers and sensors and a corresponding PLC lead many industrial systems integrators to use only products made by one company in their design in hopes that they will be able to get the overall system to work. Because the hardware/software co-dependency is so high in many high power industrial products changing even a few products can send a project into major redesign.

In view of the foregoing problems associated with the prior art approach to electrical power and control systems, it has become desirable to develop electrical apparatus utilizing a computer to control the operation of an end device without any intervening combinational logic devices to condition the signals produced by the computer prior to applying same to the power switching devices associated with the end device, and wherein the resulting apparatus can be interconnected in a peer-to-peer network.

SUMMARY OF THE INVENTION

The present invention solves the problems associated with the prior art approaches for controlling the power applied to electrical end devices through the utilization of a computer by providing an electrical controller which does not require intervening combinational logic devices to condition the signals produced by a computer for application to the power switching devices for the end device. By utilizing a computer having outputs that are readily programmable, the need for any intervening combinational logic devices between the computer and the power switching devices is eliminated.

All devices using power require specific and frequently different wave forms to function. These wave forms are created by turning a specific combination of power switches on and off in a series of sequences. Synchronization of the operation of the different switches produces different wave forms. All synchronized wave forms can be written as mathematical expressions or sets of equations, and are readily available to those skilled in the art. Today's power switching devices, such as an IGBT, Gate Turn Off SCR (GTO), Silicon Controlled Rectifier (SCR) or the like, are used to satisfy most of the requirements in motor technology and/or higher power industrial devices. In motor technology, the requirement typically is to cycle the switches at a rate of 2,500 to values higher than 10,000 times per second when using IGBTs or GTOs. For SCRs the rate of switching is much lower. The present invention has direct connection of each individual computer processor output line to a specific power switch within a power switching device using (only if required) well known isolation and voltage level shifting techniques. Synchronization of the various pulses to the different switches is managed by the computer running software using the desired mathematical equations with slight modifications to ensure that appropriate time delays (or dead times) are present for the end device to run, and not have a dead short between the switches. The dead times are created by having the computer count clock pulses between the operations used to turn switches off and on. If isolation and voltage level shifting are used there is a minimal propagation delay inherent to the devices. The propagation delays become a constant which is equal in duration on each of the output lines and therefore can be ignored.

With the increase in the amount of the controlling logic that is completed in software, the amount of hardware is reduced, and it can be more universal. The same hardware can be used for many different end devices including higher power devices such as AC motors, DC motors, or Brushless DC motors or the like. Precision in controlling the end devices can be increased in this process, because the end device becomes far more information driven. But, to increase precision the amount of information processed frequently must be increased. In control software this means the need for "real time"(or within a few microseconds) information is increased. Speed can be very important.

The controllers of the present invention may be interconnected in a peer-to-peer arrangement, through the use of communication interfaces, permitting each controller to communicate with any or all of the other controllers within the peer-to-peer network. Various types of devices, such as input/output devices, personal computers, sensors having logic incorporated therein, etc., can be connected to a storage location (way station) associated with each controller permitting data and/or information collected by such a device associated with one way station to be readily accessible by its associated controller or by another controller within the network.

Using a way station as a place to put information required by external controllers and having the computer in the external controller retrieve it as it requires the information for processing allows the end device processing to be isolated and minimal.

The level of integration in a system designed using this invention is more a function of the tasks and processes being completed than the dependencies of the hardware/software chosen.

BRIEF DESCRIPTION OF THE DRAWINGS

FIG. 4 is a schematic diagram of a prior art drive system.

FIG. 5 is a simplified schematic diagram of a drive system embodying the present invention.

FIG. 6 illustrates representative pulse width modulated waveforms on the outputs of the computer utilized by the present invention and as applied to a three phase induction motor.

FIG. 7 illustrates the time delay between waveforms in associated power switching devices utilized by the present invention.

FIG. 8 illustrates representative waveforms on the outputs of the computer utilized by the present invention and as applied to a regenerative D.C. motor.

DESCRIPTION OF THE PREFERRED EMBODIMENT

Figure 1:
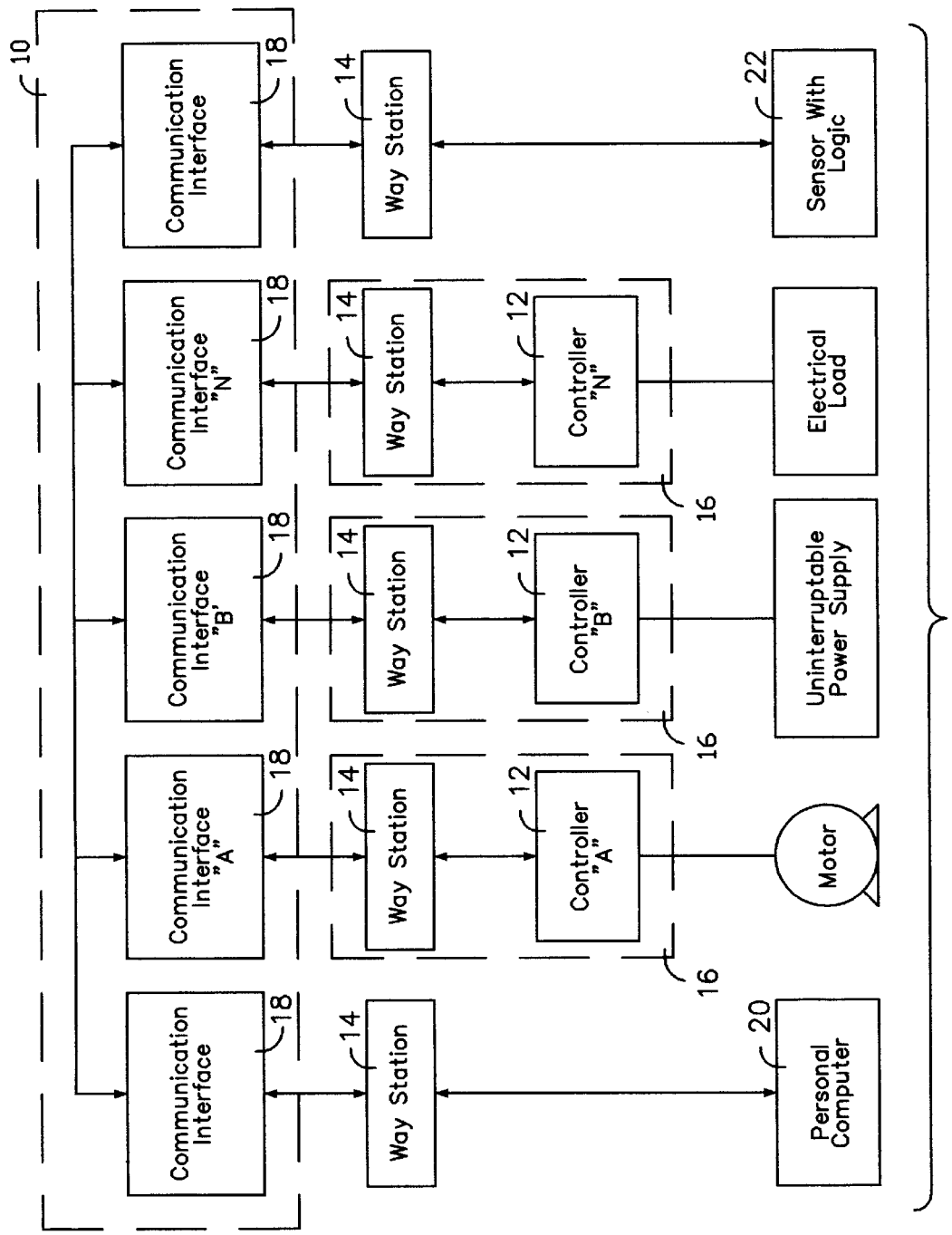
FIG. 1 is a schematic diagram of a peer-to-peer network for a system utilizing the technology embodied in the present invention.

Referring now to the drawings where the illustrations are for the purpose of describing the preferred embodiment of the present invention and are not intended to limit the invention described herein, FIG. 1 is a schematic diagram of a peer-to-peer network 10 for a system, utilizing a plurality of controllers 12, or the like, and employing the technology embodied in the present invention. Each controller 12 has a way station 14 associated therewith. The combination of each controller 12 and its associated way station 14 forms a cell, shown generally by the numeral 16, having a communication interface 18 associated therewith. The communication interfaces 18 for a plurality of cells 16 are interconnected forming the peer-to-peer network 10. Personal computers 20 and/or sensing devices 22 incorporating logic can also be interconnected to the peer-to-peer network 10 by utilizing a communication interface 18 and a way station 14. Various means can be utilized to interconnect the communication interfaces 18, including any standard physical communications layer, such as wire, fiber optic cable, etc.

Figure 2:
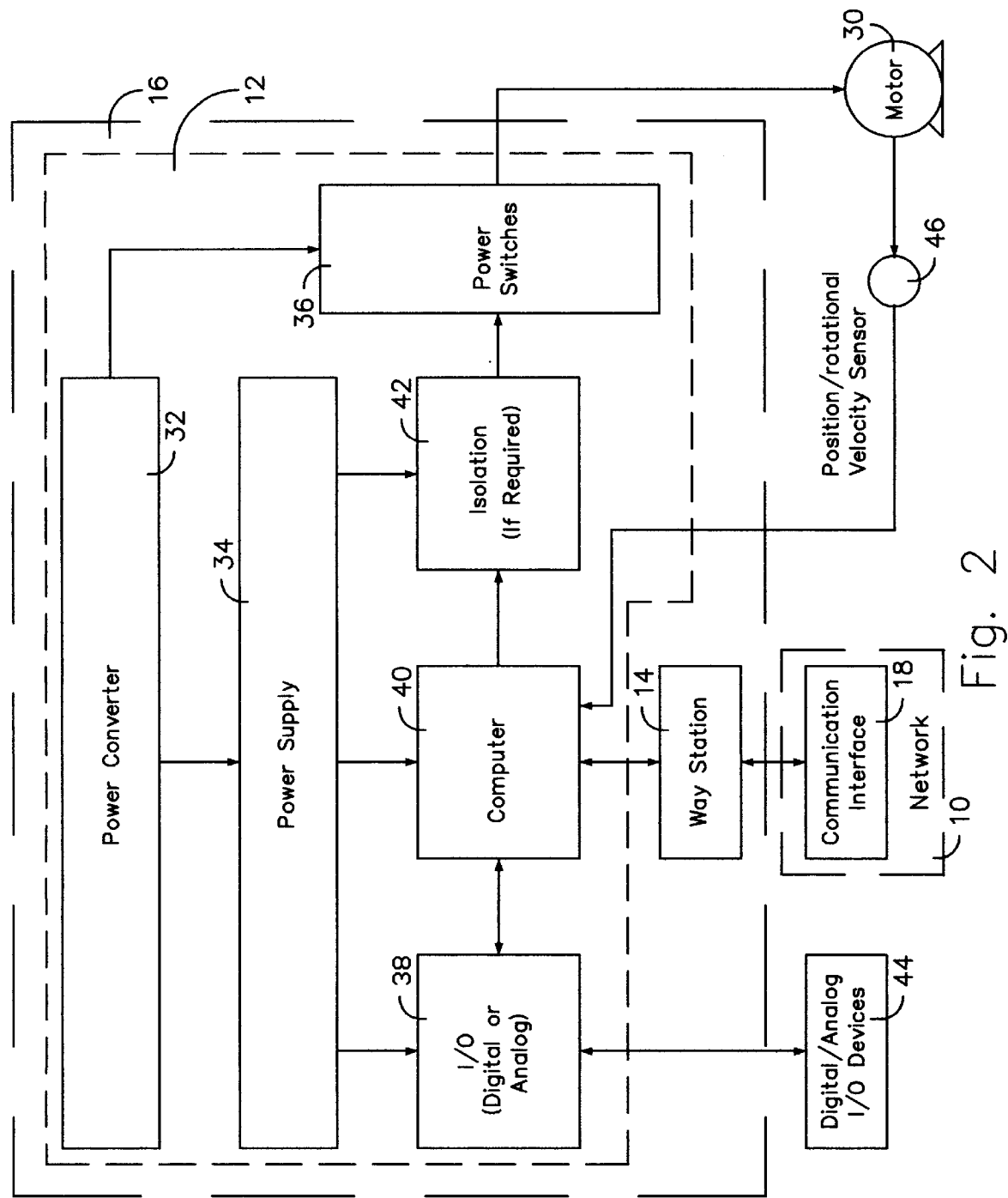
FIG. 2 is a detailed schematic diagram of a cell comprising the controller and associated way station illustrated in FIG. 1.

Referring now to FIG. 2, a detailed schematic diagram of cell 16 is illustrated. In this Figure, like components to those illustrated in FIG. 1 carry the same reference numeral. This Figure illustrates that the controller 12 for a motor 30 includes a power converter 32 having outputs connected to inputs to a power supply 34 and to power switching devices 36, such as IGBT's, SCR's, etc. Power supply 34 can accept a wide range of input voltages without a major change in the components comprising same. In addition, power supply 34 produces a number of isolated control voltage outputs. The outputs of power supply 34 are connected to digital or analog inputs/outputs 38, the input to a computer 40, and to the input to an isolation device 42, when required due to the power levels involved. Such an isolation device provides physical separation between voltage levels. An output of computer 40 is bi-directionally connected to the digital or analog inputs/outputs 38. Another output of computer 40 is similarly bi-directionally connected to the way station 14. In addition, an output of computer 40 is connected to the isolation device 42 (when required). External digital/analog inputs/outputs 44 are connected to digital or analog inputs/outputs 38. The output of isolation device 42 (when required) is used as an input to the power switching devices 36 whose outputs are connected to the motor 30. Alternatively, if the power levels permit, the outputs of the computer 40 may be connected directly to the inputs to the power switching devices 36, thus eliminating the need for the isolation device 42. Depending upon the type of motor 30 utilized, a position/rotational velocity sensor 46 may be utilized to determine motor shaft position and speed. For example, if motor 30 is a brushless D.C. motor, such a sensor 46 is typically required When a position/rotational velocity sensor 46 is utilized, its output is connected to an input computer 40.

Figure 3:
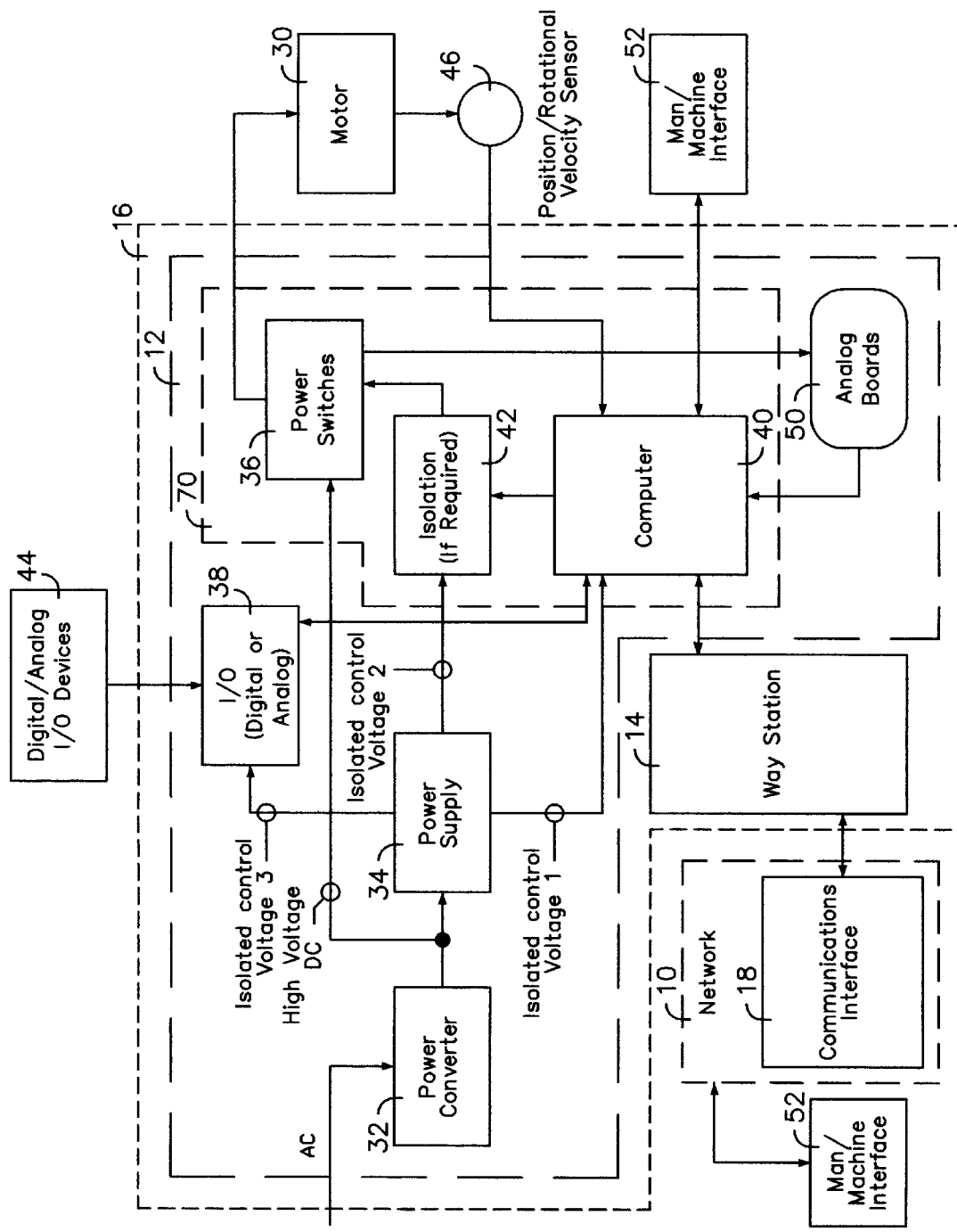
FIG. 3 is a more detailed schematic diagram of the cell illustrated in FIGS. 1 and 2.

A more detailed schematic diagram of cell 16 is shown in FIG. 3 wherein like components in FIGS. 1 and 2 carry the same reference numeral. In this case, the power converter 32 converts incoming A.C. voltage to a D.C. output voltage which is used as an input to the power switching devices 36. In addition, the D.C. output voltage of power converter 32 is utilized as an input to power supply 34, which "steps down" the input voltage to various isolated control voltage levels as required by the components for which it provides power, i.e., computer 40, isolation device 42 (when required), and digital or analog inputs/outputs 38. The outputs of the isolation device 42 (when required) are connected to the input to the power switching devices 36. The outputs of the power switching devices 36 are connected to the motor 30 and to analog boards 50 to provide motor operation data, e.g., current, voltage, torque, etc., which are utilized as inputs to computer 40. A man/machine interface device 52 may be connected to an input/output to computer 40 or to the network 10.

Referring now to FIG. 4, a schematic diagram of a portion 80 of a typical prior art AC motor controller is illustrated. In this case, the outputs of a computer 82, shown as signals D, E, F are connected to inputs to various types of hardware 54, such as gates and logic devices (frequently an ASIC), etc., which are utilized to condition the signals from the computer 82 and produce output signals. In the prior art the hardware 54 modifies the signals issued by the computer to create the exact inputs required by the particular power switching devices being used The inputs required by the various power switching devices for many different end devices are well known in industry and are frequently represented in wave forms such as represenstive pulse width modulated waveforms or signals A, A', B, B', C, and C', shown in FIG. 6. (A' indicating inverted signal of signal A, and so on). For example, the hardware 54 would commonly perform such functions as inverting the signal, introducing delays to produce the dead times between the top and bottom of the totem pole tung on, and injecting needed harmonics. Signals A, A', B, B', C and C' are utilized as inputs to isolation device 58 (when required) which produces output signals A, A', B, B', C, and C' (A indicating signal A after having gone through the isolation devices, and so on) for application to the power switching devices 56. The isolation devices 58 are devices such as optocouplers, level shifters and the like which allow the signal to safely be increased in voltage. The only change in the timing of the signal is hat of the propagation delay, which is equal and consistent on all switches. The outputs of the power switching devices 56 are applied to the inputs to a motor 60, for example, a three phase induction motor. A position/rotational velocity sensor 62 to determine motor shaft position and speed may be utilized. Bus voltage is applied as an input to the power switching device 56 for application to the motor 60. It should be noted, however, that in the prior art any other type of electrical device would utilize a totally different electrical schematic diagram Referring now to FIG. 5, a simplified schematic diagram of a portion 70 of a controller 12 utilizing the present invention is illustrated. Isolated control voltage 1 is applied as an input to computer 40. The computer 40 has a number of outputs, with as many available for power switching control as is needed to have one direct computer processor output line for each power switch in the power switching device 36. Every electrical device, including high power devices, require specific and frequently different wave forms to function. These wave forms are created by turning a specific combination of power switches on and off in a series of sequences. Synchronization of the operation of the different switches produces different wave forms. All synchronized wave forms can be written as mathematical expressions or sets of equations, and are readily available to those skilled in the art. Synchronization of the various pulses to the different switches is managed by the computer running software using the desired mathematical equations with slight modifications to ensure that appropriate time delays (or dead times) are present for the end device to run, and not have a dead short between the switches. In this case, the outputs of computer 40 are shown in FIG. 6 as representative pulse width modulated waveforms or signals A, A', B, B', C, and C' which are utilized as inputs to the isolation device 42 (when required). Isolated control voltage 2 is applied as an input to the isolation device 42 (when required). As with the prior art, isolation device 42, such as optocouplers and level shifters, are needed to safely increase the voltage of the signals. In the present invention all lines between the computer 40 and the switches in the power switching device 36 have the same isolation devices 42 (if required). There is a minimal propagation delay inherent in these devices. When the same devices are used, the propagation delays are equal between the output lines and therefore can be ignored in the programming of the synchronized wave forms. The outputs of the isolation device 42 are applied to the inputs to the power switching devices 36, the outputs of which are connected to the inputs to a motor 30, such as a three phase induction motor. The time delay $t_d$ between waveforms X and X', shown in FIG. 7, is representative of the deliberately inserted time delay between waveforms A and A', B and B', and C and C' which provides a discrete time interval when no related pair of power switching devices conduct. The time delay (dead time) is created in the computer program by having the computer count clock pulses between the operations used to turn one switch off and the next one on. The value $t_d$ is dependent upon the physical characteristics of the power switching devices utilized. If another type of motor is utilized, a different number of outputs emanate from computer 40 and the resulting output waveforms are different from those shown in FIG. 6. For example, FIG. 8 illustrates the waveforms or input signals A and A', B and B' which are applied to the power switching devices (the transistors illustrated) to control the operation of a regenerative D.C. motor. In addition, if still another type of motor is utilized, such as a brushless D.C. motor, a position/rotational velocity sensor 46 may be provided to determine the position of the shaft of the motor and the speed of same, and the output of the sensor 46 is utilized as an input to computer 40. Each electrical end device has its own required wave form, and each kind of power switching device has its operational requirements. These can be accommodated in computer software.

From the foregoing, it is apparent that the controller of the present invention differs from that disclosed in the prior art by the elimination of the intervening combinational logic devices used to condition the signals from the computer 40 for the application to the inputs to the isolation device 42 (when required) or directly to the inputs to the power switching devices 36 when an isolation device 42 is not required- The elimination of such intervening combinational logic devices results in the signals produced on the outputs of the computer being applied to the inputs to the isolation device 42 (when required), directly to the inputs to the power switching devices 36 when an isolation device 42 is not required without any change in their characteristics, such as waveform, amplitude, etc. Since the outputs of the computer 40 are programmable, other types of motors or end devices, such as an uninterruptible power supply, can be readily driven or powered merely by changing the number of computer outputs and changing the signals transmitted thereon.

It is apparent from the foregoing that the present invention provides a number of features not available with prior art apparatus. For example, prior art apparatus requires the use of hardware, in the form of gates, etc., to condition signals produced by the computer prior to application to the isolation device (when required) or to the power switching devices when an isolation device is not required. In the present invention, such intervening combinational logic devices are eliminated, reducing the amount of hardware involved and simplifying the overall network configuration.

With the increase in the amount of the controlling logic that is completed in software, the amount of hardware is reduced, and it can be more universal. In the present invention the same hardware can be used for many different end devices including higher power devices such as AC motors, DC motors, or Brushless DC motors or the like. Precision in controlling the end devices can be increased in this process, because the end device becomes far more information driven. But, to increase precision the amount of information processed frequently must be increased. In control software this means the need for "real time" (or within a few microseconds) information is increased. To gain increased precision information must be obtained from external devices including sensors, and the like, for the computer to use. Speed can be very important. The functionality of the end devices can now be the full range allowed with the ability to express mathematically the control wave forms needed to turn the power switches on and off.

In the prior art apparatus, sensors, such as temperature, pressure, etc., are attached to a PLC, which, in turn, is attached to a controller, including a computer. In the present invention, PLC's are not required and such sensors (input/output devices) are connected to the nearest digital or analog input/output 38 which is connected to the computer 40 within the peer-to-peer network 10 thus eliminating the need for "hard-wired" cables to connect the sensors to the PLC and then from the PLC to the controller for the end device. By this approach, the cabling associated with "hard-wiring" the sensors to the PLC and then from the PLC to the controller is eliminated. In addition, a significant amount of hardware is not required. Thus, utilization of the present invention greatly reduces the complexity and cost associated with wiring a system or network and increases control flexibility. Since the controllers within the network are interconnected in a peer-to-peer arrangement, rather than in a master/slave arrangement, the operation of an end device can affect or be affected by the operation of another end device or other end devices within the network. In essence, the end devices can "communicate" with one another over the peer-to-peer network. Each end device is "aware" of its function and its operational relationship to the other end devices within the network.

Frequently, in systems combining motors and other electrical devices, the mathematical equations needed to specify the synchronized wave forms to be altered using a reference variable from some other device. All devices in the system often run under restricted time frames. By placing each variable required for reference in a specific place on a network, the processor can retrieve it as required for its own processing, with network traffic being kept to a minimum.

Another advantage of the present invention is that a hardware change is not required as the motor size is changed, although some scaling of the size of the power components may be required. In the prior art approach, the hardware selection is determined by the combination of power, motor size and drive application, and any change in power, motor size or application necessitates a complete hardware change. The elimination of such hardware, i.e., the intervening combinational logic devices, in the present invention overcomes the foregoing problems which are inherent in prior art apparatus.

Other areas of the present invention also have unique features. For example, the power supply allows for a wide range of input voltages without major changes therein. At the present time, it is believed that there are no other power supplies readily available which can accept such a wide range of input voltages. Because the design of the power supply can accept such a wide range of input voltages without a major change in the components comprising same, a commonality of components exists which reduces overall manufacturing costs. In addition, the power supply can produce a number of isolated control voltage levels as required by the components for which it supplies power. It has also been found that the power supply utilized by the present invention can function in a wide variety of environments without substantial design changes.

The present invention also utilized the concept of the way station (storage location) which is associated with a controller. Any digitized data from any controller or other input/output device, including sensors, can reside within a way station until requested by the controller associated with the way station or another logic device within the network. Such a way station can be a dual port ram which can be accessed from two sides, that is, data can be placed therein from a sensor and can be retrieved by its associated controller or any other controller within the network. By using this approach, such data is transmitted over the network only when requested, thus limiting network transmissions to that which involves relevant information.

Referring to the network shown in FIG. 1, a true peer-to-peer network is illustrated. In this case, there is no dependency between and among controllers within the network since there is no master/slave relationship although information from sensors attached to other controllers may be used to increase the precision of processing.

In addition, the network is utilized to transport data between and among the end devices—no processing or control is undertaken at the network level. The utilization of a true peer-to-peer network permits the setting up of an automated system on a "cell" by "cell" basis with interconnection between or among "cells" being accomplished whenever needed while permitting individual "cells" to be operable as soon as established. In this manner, automation such as in a manufacturing facility, can be accomplished on a piece by piece (cell by cell) basis rather than requiring completion of the design and installation of the entire system before actuating same. In addition, by utilizing a true peer-to-peer network, reconfiguring the network is a relatively easy task and is substantially less expensive than present approaches wherein the network utilizes a master/slave arrangement. When such a master/slave arrangement is utilized, network changes usually necessitate discarding some or all hardware, resulting in substantial costs.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. An electrical apparatus connected to an electrical end device for controlling variance in the operation of an the electrical end device, said apparatus comprising:

a computer having a plurality of outputs, each one of said plurality of outputs having a signal produced thereon;

said computer processing a set of mathematical expressions derived from synthesis of electrical wave form requirements specific to said end device and mathematically expressed power switch specifications including switch specific dead time requirements;

each said output signal being produced by said computer using a subset of said mathematical expressions;

a power switching device connected to said plurality of outputs of said computer and receiving said signals;

said signals turning power switches contained within said power switching device on and off;

wherein the characteristics and configuration of said signals remain unchanged between said outputs of said computer and inputs to said power switching device; and said apparatus producing the desired wave forms controlling the application of electrical power to said the electrical end device.

2. The apparatus as defined in claim 1 further including an isolation device interconnected between said outputs of said computer and said power switching device.

3. The apparatus as defined in claim 1 further including means for storing data.

4. The apparatus as defined in claim 1 further including a power supply electrically connected to said computer.

5. The apparatus as defined in claim 4 further including input/output devices electrically connected to said power supply and to said computer.

6. The apparatus as defined in claim 4 further including a power converting device electrically connected to said power supply to provide power to said power supply.

7. The apparatus as defined in claim 3 further including a communication interface electrically connected to said storage means permitting communication of data from said computer and from said storage means to another said computer.

8. The apparatus as defined in claim 7 wherein said communication of data from said computer to another said computer is accomplished over a network arranged in a peer-to-peer arrangement.

9. The apparatus as defined in claim 8 wherein said communication of data from said computer to another said computer over said network is accomplished through communication interfaces.

10. An electrical apparatus operatively connected to an electric motor and comprising a computer;

said computer receiving an isolated control voltage;

said computer having a plurality of outputs;

said plurality of outputs each carrying a signal;

said signals being generated in said computer using motor specific mathematical expressions derived from synthesis of electrical wave form requirements specific to said electric motor and mathematically expressed power switch specifications including switch specific dead time requirements;

a power switching device operatively connected to said computer;

said plurality of outputs of said computer being applied directly to respective switches in the power switching device;

said power switching device receiving a bus voltage; and said power switching device supplying power to an electric motor to produce control variance in motor operation such as speed and torque.

11. The electrical apparatus cited in claim 10 and further comprising:

an isolation device for receiving said plurality of outputs of said computer to provide physical separation of different voltage levels;

said isolation device receiving a second isolated control voltage;

said isolation device having a plurality of isolated outputs;

said plurality of isolated outputs each carrying an isolated signal;

said plurality of isolated outputs of said isolated device being directed to respective switches in the power switching device;

said power switching device receiving a bus voltage; and said power switching device supplying power to the electric motor to produce control variance in motor operation such as speed and torque.

12. The electrical apparatus cited in claim 10 wherein:

said motor specific mathematical expressions in said computer are altered by adding dead times between switch activation into the relationship of two corresponding said signals thereby preventing dead shorts, with the duration of the required dead times being a combination of the type of motor and the type of power switch connected.

13. The electrical apparatus cited in claim 11 wherein:

said motor specific mathematical expressions in said computer are altered by adding dead times between switch activation into the relationship of two corresponding said signals thereby preventing dead shorts, with the duration of the required dead times being a combination of the type of motor and the type of power switch connected.

14. An electrical apparatus comprising:

a power converter to accept any input electrical power and convert it so it can be used by the attached devices;

said power converter having two electrical outputs;

a power supply receiving the first said electrical output of said power converter;

said power supply creating three isolated control voltage outputs from said input power;

an internal I/O device receiving the first said isolated control voltage output from said power supply;

a computer receiving the second said isolated control voltage output from said power supply;

an isolation device receiving the third said isolated control voltage output from said power supply;

power switches connected to said power converter to receive its second electrical output specifically the bus voltage;

said internal I/O device and said computer connected to each other exchanging inputs and outputs;

said computer having output going to said isolation device;

said isolation device having output going to said power switches;

and further including a digital/analog I/O device connected to the said internal I/O device to receive and deliver external information to and from the computer;

a way station connected to said computer as a physical location to place data which is available to be used by other devices on the computer network;

said way station connected to a communications interface to enable said computer network to perform transactions;

an electric motor connected to said power switches and a Position/Velocity sensor;

wherein said power switching device supplies power to said electric motor to produce control variance in motor operation such as speed and torque within said computer network.

* * * * *